US011240746B1

(12) United States Patent
Wong et al.

(10) Patent No.: US 11,240,746 B1
(45) Date of Patent: Feb. 1, 2022

(54) SELECTING ACCESS POINT BASED ON MESH NETWORK RESOURCE UTILIZATION METRIC

(71) Applicant: Amazon Technologies, Inc., Seattle, WA (US)

(72) Inventors: Chiu Ngok Eric Wong, San Jose, CA (US); Avinash Joshi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 708 days.

(21) Appl. No.: 15/842,355

(22) Filed: Dec. 14, 2017

(51) Int. Cl.
*H04W 24/08* (2009.01)
*H04W 48/20* (2009.01)
*H04W 84/18* (2009.01)

(52) U.S. Cl.
CPC ........... *H04W 48/20* (2013.01); *H04W 24/08* (2013.01); *H04W 84/18* (2013.01)

(58) Field of Classification Search
CPC ...... H04W 48/20; H04W 24/08; H04W 84/18
See application file for complete search history.

(56) References Cited

U.S. PATENT DOCUMENTS

| 2008/0080414 | A1* | 4/2008 | Thubert | H04W 76/12 370/328 |
| 2010/0185753 | A1* | 7/2010 | Liu | H04L 65/4084 709/219 |
| 2018/0331935 | A1* | 11/2018 | Ross | H04L 43/16 |

OTHER PUBLICATIONS

Chapter 11, 802.11r, 802.11k, 802.11v, 802.1w Fast Transition Roaming, 28 pages, Dec. 7, 2016.
IEEE Std 802.11-2016, IEEE Standard for Information Technology—Local and Metropolitan Area Networks—Specific Requirements, Part 11: Wireless LAN MAC and PHY Specifications, pp. 205-209, 496-507, 520-527, 1024-1032, 1047, 1247-1259, 1404-1414, 1493-1499, 1659, 2084, 2132-2224, 2749, 3510-3517, Jul. 11, 2017.

* cited by examiner

*Primary Examiner* — Jae Y Lee
*Assistant Examiner* — M Mostazir Rahman
(74) *Attorney, Agent, or Firm* — Lowenstein Sandler LLP

(57) ABSTRACT

A mesh network device includes a radio and an application processor coupled to the radio. The application processor includes a network association engine, which receives, receives, from a client consumption device, a requested content identifier; receives, from a first access point, a beacon including a first throughput of the network path between the network ingress device and the first access point; receives, from a second access point, a beacon including a second throughput of the network path between the network ingress device and the second access point; determines that the first throughput exceeds the second throughput; transmits, to the first access point, an association request followed by a digital content request comprising a requested content identifier; receives, from the first access point, the first requested digital content item; and causes the requested digital content item to be rendered by the client consumption device.

17 Claims, 15 Drawing Sheets

| Network ID 520 | PHY layer parameters 530 | Basic rate set 540 | Timestamp 550 | Resource utilization metic 560 | Content ID 570 | [other information] |
|---|---|---|---|---|---|---|
| SSID1 | 102 | 12 | 1234 | 1234 | 00-14-22-01-23-95 | |
| SSID2 | 104 | 14 | 2345 | 1280 | 00-14-22-01-23-97 | |
| SSID3 | 102 | 12 | 3456 | 1805 | 00-14-22-01-23-55 | |
| SSIDN | 102 | 12 | 4567 | 2424 | 00-14-22-01-23-72 | |

Scan report 500

SELECTING ACCESS POINT BASED ON MESH NETWORK RESOURCE UTILIZATION METRIC

BACKGROUND

A wireless mesh network may support establishing point-to-point wireless links between the participating communication devices. A network node may utilize the wireless mesh network for accessing digital content stored on one or more digital content servers within or outside of the mesh network.

BRIEF DESCRIPTION OF DRAWINGS

The examples described herein will be understood more fully from the detailed description given below and from the accompanying drawings, which, however, should not be taken to limit the application to the specific examples, but are for explanation and understanding only.

FIG. 5 schematically illustrates an example scan report generated by a network device operating in accordance with embodiments of the present disclosure.

DETAILED DESCRIPTION

Figure 1:
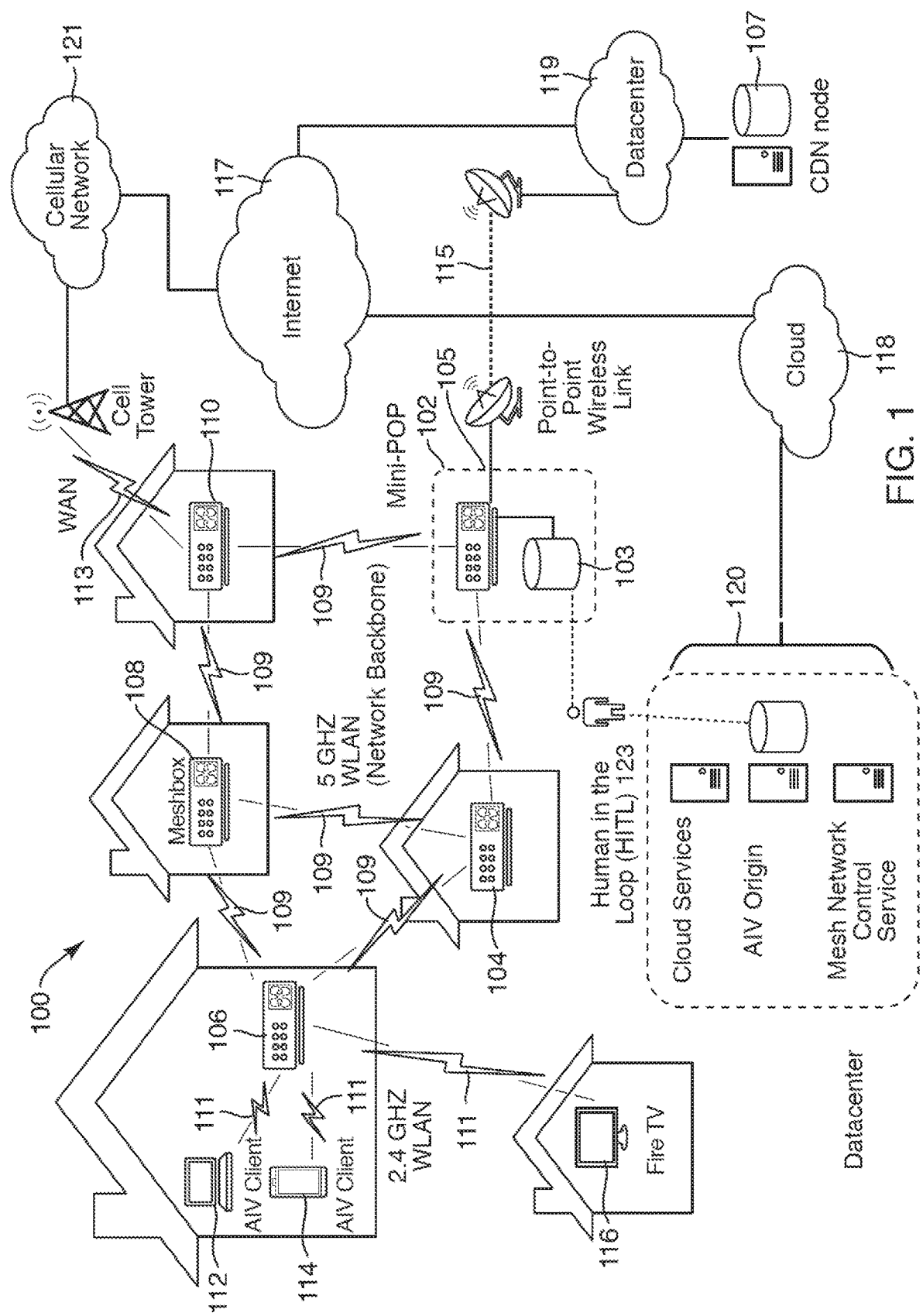
FIG. 1 is a component diagram illustrating hardware devices organized in a wireless mesh network.

Described herein are systems and methods for selecting, by a network device, a wireless access point among multiple available wireless access points, by utilizing a metric reflecting the mesh network resource utilization.

Nodes of a mesh network may establish peer-to-peer wireless links for transmitting messages to each other. In particular, messages may be transferred, through other nodes, between the source and destination nodes that are not in direct communication with each other. In an illustrative example, a mesh network may be employed for digital content distribution to client network devices in an environment of limited connectivity to broadband Internet infrastructure. The digital content may include video and/or audio files, such that each digital content file may be stored and/or at least partially cached by one or more content serving nodes, which may be located outside of the wireless network (content distribution network (CDN) nodes) and/or within the wireless network (content caching nodes). Accordingly, a network device may connect to a mesh access point and request a digital content item from a CDN node via a wireless mesh network path that may include the mesh access point, one or more intermediate nodes, and a network ingress device which connects the mesh network by one or more wireless and/or wireline connections to a backbone network in communication with one or more CDN nodes.

If two or more mesh access points are found within the radio transmission range of the network device, the latter may select one of the access points. In an illustrative example, the network device may select the access point that provides the better radio signal strength (e.g., as measured by the receive signal strength indicator (RSSI)).

In order to improve the overall efficiency of content distribution by the wireless mesh network, the network device may select an available access point by utilizing one or more access point selection criteria reflecting the resource utilization by the mesh network in serving the digital content to the network device. In an illustrative example, each access point may calculate the value of the network resource utilization metric reflecting a characteristic of data frame transmission along a network path from the access point to a network ingress device which connects the mesh network by one or more wireless and/or wireline connections to a backbone network in communication with one or more CDN nodes. Data frame transmission characteristics reflected by the network utilization metric may include the latency of the network path (e.g., measured by the elapsed time of data frame transmission along the network path), the throughput of the network path (e.g., measured by the minimum effective data transmission rate supported by network hops of the network path), the medium utilization of the network path (e.g., measured by the Modulation and Coding Scheme (MCS) rate)), and/or the power consumption of the network nodes of the network path, as described in more detail herein below.

The access point may broadcast the calculated value of the network resource utilization metric, e.g., by transmitting network management frames, such as probe response and/or beacon frames. The network device may compare the metric values received from multiple available access points and select the access point which advertises the optimal (e.g., minimal or maximal) value of the network resource utilization metric.

In addition to the client-driven access point selection, the present disclosure further enables an access point to advise the client to associate with another access point which may advertise a better value of the network resource utilization metric. Furthermore, the suggested alternative access point may start content pre-fetching in anticipation of the client association request, in order to reduce the initial latency in the content delivery to the network device caused by the network device's disassociating from the previous access point and associating with the specified access point.

Various aspects of the above referenced methods and systems are described in detail herein below by way of example, rather than by way of limitation.

FIG. 1 is a component diagram illustrating hardware devices organized in a wireless mesh network. As illustrated by FIG. 1, hardware devices 102-110 may be organized in a mesh network 100, for content distribution to client devices in an environment of limited connectivity to broadband Internet infrastructure in order to transfer digital content to one or more client consumption devices. In the depicted embodiment, the mesh network 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being an ingress device to the mesh network 100.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the mesh network 100 for the content files stored in the mesh network 100. Meaning the mini-POP 102 may be the only node in the mesh network 100 having access to the attached storage or a communication channel to retrieve content files stored outside of the mesh network 100. In other embodiments, multiple mini-POP devices may be deployed in the mesh network 100, but the number of mini-POP devices should be much smaller than a total number of network hardware devices in the mesh network 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the mesh network 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the mesh network 100. In some cases, the mini-POP device 102 does not have an Internet connection via the point-to-point wireless connection 105 and the content is stored only in the attached storage device 103 for a self-contained mesh network 100.

The mesh network 100 also includes multiple mesh nodes 104-110 which may establish multiple P2P wireless connections 109 among themselves in order to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) may be provided by multi-channel (MRMC) network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the mesh network 100. In particular, the second mesh node 106 is wirelessly coupled to a first client consumption device 112 (Amazon Instant Video (AIV) client) via a first N2C wireless connection 111, a second client consumption device 114 (AIV client) via a second N2C wireless connection 111, and a third client consumption device 116 (e.g., the Fire TV device) via a third N2C wireless connection 111. The second mesh node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be application programming interfaces (APIs) provided for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the mesh network 100 remotely. Also, the cellular connection 113 may aid in the debugging and optimization of the mesh network 100. In other embodiments, other low bandwidth services may also be offered through this link (e.g. email, shopping on Amazon.com, or the like).

Although only four mesh nodes 104-110 are illustrated in FIG. 1, the mesh network 100 can use many mesh nodes, wireless connected together in a mesh network, to move content through the mesh network 100. The 5 GHz WLAN channels are reserved for inter-node communications (i.e., the network backbone). Theoretically, there is no limit to the number of links a given mesh node can have to its neighbor nodes. However, practical considerations, including memory, routing complexity, physical radio resources, and link bandwidth requirements, may place a limit on the number of links maintained to neighboring mesh nodes. Mesh nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each mesh node can support depends on a number of factors including memory, bandwidth requirements of the client, incoming bandwidth that the mesh node can support, and the like. For example, the mesh nodes provide coverage to users who subscribe to the content delivery service and consume that service through an AIV client on the client consumption devices (e.g., a mobile phone, a set top box, a tablet, or the like). It should be noted that there is a 1-to-many relationship between mesh nodes and households (not just between nodes and clients). This means the service can be provided without necessarily requiring a customer to have a mesh node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The mesh nodes can be located in various structures, and there can be multiple mesh nodes in a single structure.

The mesh network 100 may be used to accomplish various tasks, including moving high bandwidth content to users and storing that content in the network itself. The content moving task may be performed by hardware using the radio links between mesh nodes and the radio links between mesh nodes and client consumption devices, and by software using the routing protocols used to decide where to push traffic and link and channel management used to configure the mesh network 100. The content storing task may be performed using caches of content close to the user. An example content delivery network (CDN) implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the mesh network 100 includes the mini-POP device 102 that is designed to handle smaller amounts of traffic than a typical POP rack. Architecturally, the mini-POP device 102 may be designed as a mesh node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache.

The mesh network 100 may be considered a multi-radio multi-channel (MRMC) mesh network. MRMC mesh networks are an evolution of traditional single radio mesh networks and a leading contender for combatting the radio resource contention that has plagued single radio mesh networks and prevents them from scaling to any significant size. The mesh network 100 has multiple devices, each with multi-radio multi-channel (MRMC) radios. The multiple radios for P2P connections and N2C connections of the network devices allow the mesh network 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. A "hop" as used herein may refer to a portion of a network path between two neighboring nodes. The network paths to fetch content files may not be a linear path within the mesh network.

The mesh network 100 can provide adequate bandwidth, especially node-to-node bandwidth. For video, content delivery services recommend a minimum of 900 Kbps for standard definition content and 3.5 Mbps for high definition content. The mesh network 100 can provide higher bandwidths than those recommended for standard definition and high definition content.

In some embodiments, the mesh network 100 can be self-contained as described herein. The mesh network 100 may be self-contained in the sense that content resides in, travels through, and is consumed by nodes in the mesh network without requiring the content to be fetched outside of the mesh network 100. In other embodiments, the mesh network 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the mesh network 100 via the point-to-point wireless connection 105 or the HITL process at the mini-POP device 102.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication).

The mesh network 100 can provide some fault tolerance so that a single mesh node becoming unavailable for failure or reboot has minimal impact on availability of content to other users. The mesh network 100 can be deployed in an unpredictable environment. Radio conditions may not be constant and sudden losses of power may occur. The mesh network 100 is designed to be robust to temporary failures of individual nodes. The mesh network 100 can be designed to identify those failures and adapt to these failures once identified. Additionally, the mesh network 100 can include mechanisms to provide secure storage of the content that resides within the mesh network 100 and prevent unauthorized access to that content.

The cloud services 120 of the mesh network 100 can include mechanisms to deal with mesh nodes that become unavailable, adding, removing, or modifying existing mesh nodes in the mesh network 100. The cloud services 120 may also include mechanisms for remote health and management. For example, there may be a remote health interface, a management interface, or both to access the mesh nodes for this purpose. The cloud services 120 can also include mechanisms for securing the mesh network 100 and the content that resides in the mesh network 100. For example, the cloud services 120 can control device access, digital rights management (DRM), and node authentication.

Other use cases of mesh networks operating in accordance with embodiments of the present disclosure include employing mesh networks for residential, office, campus/community and public safety uses. In one example, mesh networks described herein may be employed to eliminate radio frequency dead spots and areas of low-quality wireless coverage in private residences or public spaces. In another example, mesh networks described herein may be employed to provide network access to emergency and safety personnel such as fire, police, and emergency medical technicians responding to an incident scene. Possible use cases of mesh networks operating in accordance the embodiments of the present disclosure are not limited to the above-described examples.

Figure 2:
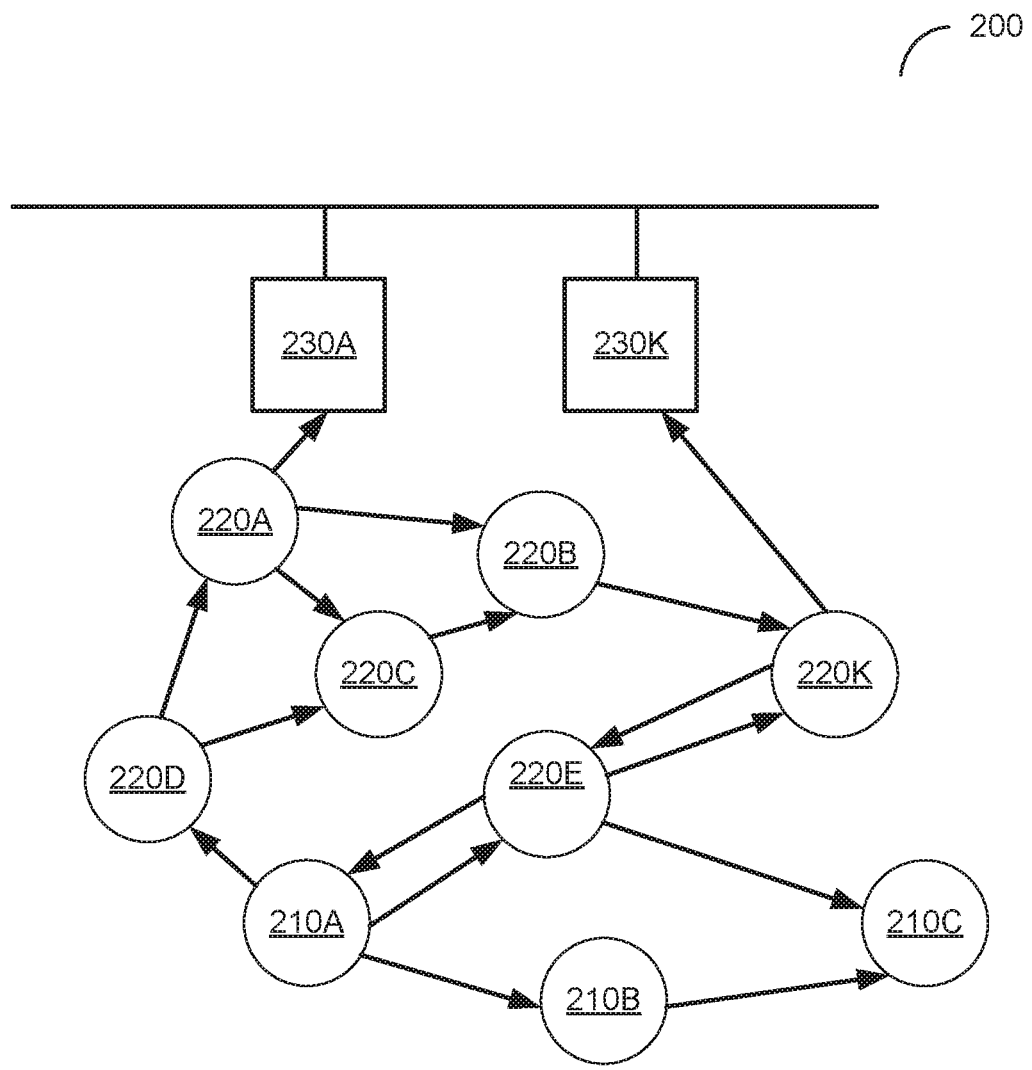
FIG. 2 is a functional network diagram of an illustrative example of a wireless mesh network operating in accordance with embodiments of the present disclosure.

FIG. 2 is a functional network diagram of an illustrative example of a wireless mesh network operating in accordance with embodiments of the present disclosure. In one embodiment, each of the network devices of wireless mesh network 100 of FIG. 1 may implement functions of one or more functional components of FIG. 2. In other embodiments, various other wireless mesh networks may include hardware and/or software components which may implement functions of one or more functional components of FIG. 2.

As schematically illustrated by FIG. 2, an example wireless mesh network 200 may include a plurality of mesh network nodes including communication devices that implement the functions of wireless mesh point stations (MP STA) 210A-210Z, mesh access points (MAP) 220A-220K, and mesh portals (MPP) 230A-220M. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

As noted herein above, network devices may establish peer-to-peer wireless links and transmit messages to each other. In particular, messages may be transferred, through other nodes, between two nodes that are not in direct communication with each other. Thus, a network device may be a source, a destination, or an intermediate node on a mesh path.

Upon booting up, a network device may discover and join a wireless mesh network operating in accordance the embodiments of the present disclosure (e.g., wireless mesh network 100 of FIG. 1). Discovering available wireless mesh networks may be performed by passive or active scanning. In the passive scanning mode, the network device records the information from any beacon frames that have been received on one or more radio channels. Beacon frames are periodically transmitted by wireless access points in order to allow network devices to detect and identify the wireless mesh network, as well as match communication parameters for determining whether to join the wireless mesh network. In the active scanning mode, the network device may transmit, on each of one or more radio channels supported by the network device, probe request frames in order to solicit responses from available networks. An access point receiving a probe request may generate a probe response advertising the network parameters.

Figure 3:
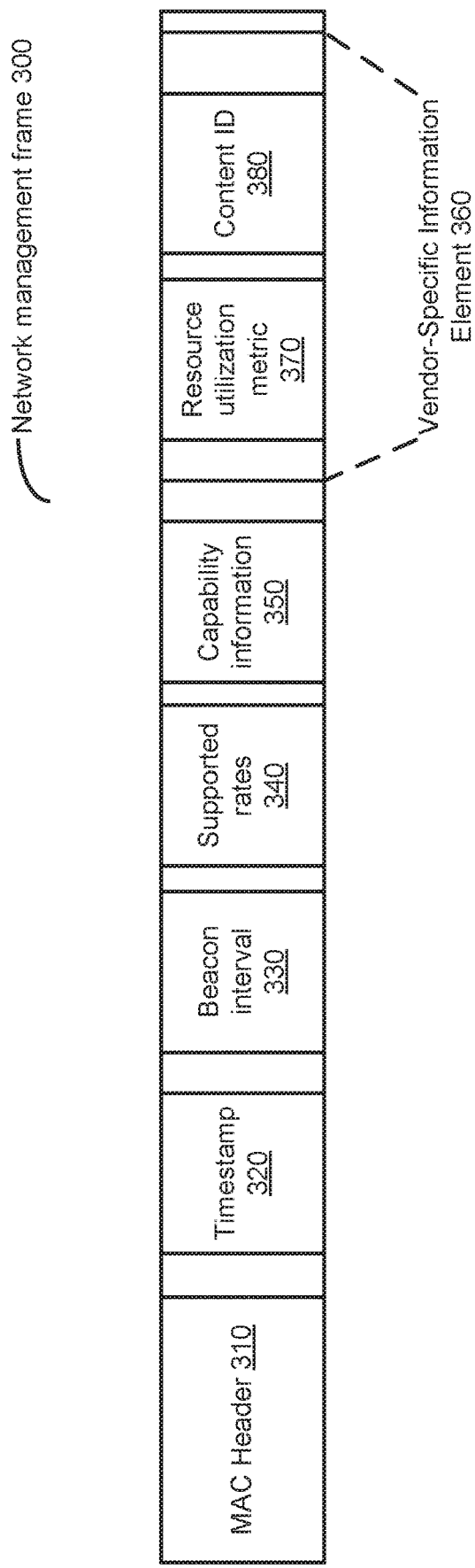
FIG. 3 schematically illustrates an example structure of a management frame transmitted by an access point operating in accordance with embodiments of the present disclosure.

Management frames, including beacon frames and probe responses, that are transmitted by wireless access points may advertise various network parameters, including physical layer (PHY) parameters and various other parameters. FIG. 3 schematically illustrates an example structure of a management frame transmitted by an access point operating in accordance with embodiments of the present disclosure. As shown in FIG. 3, the management frame 300, which may be represented by a beacon frame or a probe response frame, may include the Media Access Control (MAC) header 310 comprising the source and destination MAC addresses and various other fields. The management frame 300 may further include the timestamp 320 and the beacon interval 330. The management frame 300 may further include the supported rates 340 specifying one or more data transmission rates supported by the network. The management frame 300 may further include the capability information 350 specifying various physical layer parameters supported by the network. The management frame 300 may further include various other network parameters which are omitted from FIG. 3 for clarity and conciseness.

The management frame 300 may further include one or more vendor-specific information elements 360. In one embodiment, the vendor-specific information elements 360 may include the value 370 of the network resource utilization metric that reflects certain parameters of data frame transmission along a network path from the access point transmitting the management frame 300 to a network ingress device which connects the mesh network by one or more wireless and/or wireline connections to a backbone network in communication with one or more CDN nodes. The access point may utilize a path selection method to determine a network path to the ingress device, as described in more detail herein below, and may then calculate the value of the network resource utilization metric associated with the determined path.

Figure 4:
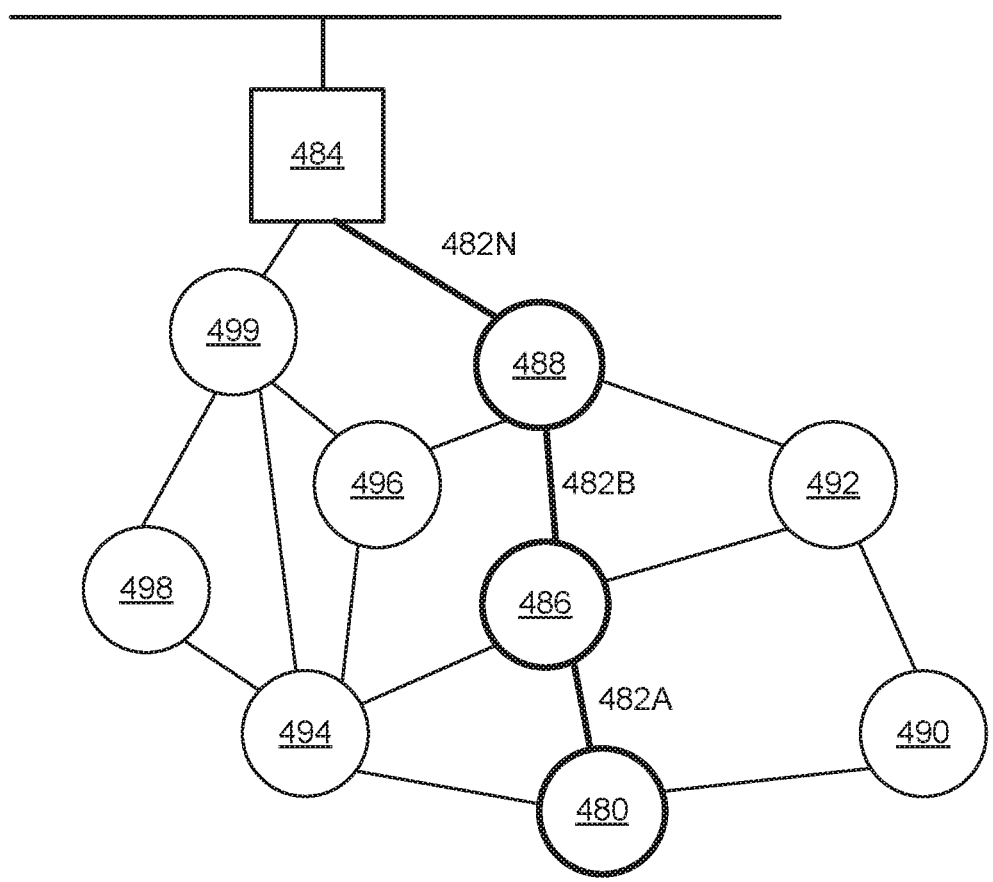
FIG. 4 schematically illustrates calculating a network resource utilization metric in a wireless mesh network operating in accordance with embodiments of the present disclosure.

In one embodiment, the network resource utilization metric may by represented by an additive cost function. As schematically illustrated by FIG. 4, the network resource utilization metric advertised by the access point 480 may be calculated as a sum of cost function values associated with each hop 482A-482N on the network path from the access point 480 to the network ingress device 484.

In an illustrative example, the network resource utilization metric represented by an additive cost function may reflect the number of network hops on the network path. In another illustrative example, the network resource utilization metric may reflect the latency of the network path. In another illustrative example, the network resource utilization metric may reflect the total power consumption by mesh nodes on the network path.

Accordingly, the network resource utilization metric represented by an additive cost function may be expressed by the following equation:

$$C = X_j + \Sigma_i Y_{ij}$$

where C represents the value of the network resource utilization metric, $X_j$ represents the network resource utilization metric characterizing the network hop between the network device and the j-th access point, and $Y_{ij}$ represents the network resource utilization metric characterizing the i-th network hop on the network path from the j-th access point to the network ingress device.

The optimal value of an additive cost function may be represented by its minimal value. In an illustrative example, the network device may compare values of the network utilization metric advertised by several access points and select the access point advertising the minimal, among multiple access points, value of the network utilization metric represented by a cost function:

$$k = \mathrm{argmin}(C_j)$$

where k represents the identifier of the access point that has advertised the minimal value of the network utilization metric, and $C_j$ represents the network utilization metric advertised by the j-th access point.

In another embodiment, the network resource utilization metric may be represented by an aggregate function of values characterizing the hops 482A-482N on the network path from the access point 480 to the network ingress device 484. In an illustrative example, the network resource utilization metric may reflect the minimum throughput among the hops 482A-482N, which is the minimum throughput supported by the network path. In another illustrative example, the network resource utilization metric may reflect the minimum, among the hops 482A-482N, medium utilization (e.g., measured by the data transmission rate, such as the Modulation and Coding Scheme (MCS) rate). In another illustrative example, the network resource utilization metric may reflect the minimum remaining battery life of network nodes on the network path from the access point to the network ingress device.

Accordingly, the network resource utilization metric represented by an aggregate function may be expressed by the following equation:

$$C = f(X_j, Y_{1j}, Y_{2j}, \ldots, Y_{nj})$$

where C represents the value of the network resource utilization metric, f represents the aggregate function (e.g., the function returning the minimal, maximal, or average value of its arguments);

$X_j$ represents the network resource utilization metric characterizing the network hop between the network device and the j-th access point, and $Y_{ij}$ represents the network resource utilization metric characterizing the i-th network hop on the network path from the j-th access point to the network ingress device.

The optimal value of an aggregate function may be represented by its maximal or minimal value. In an illustrative example, the network device may compare values of the network utilization metric advertised by several access points and select the access point advertising the maximal, among the compared values, value of the resource utilization metric represented by an aggregate function:

$$k = \mathrm{argmax}(C_j)$$

where k represents the identifier of the access point that has advertised the minimal value of the network utilization metric, and $C_j$ represents the network utilization metric advertised by the j-th access point.

In another illustrative example, the network device may compare values of the network utilization metric advertised by several access points and select the access point advertising the value of the resource utilization metric that exceeds a certain threshold value (e.g., advertised minimum throughput supported by the network path exceeding a desired throughput value).

Various resource utilization metrics are described herein as illustrative examples only. Wireless mesh networks operating in accordance with embodiments of the present disclosure may support various other resource utilization metrics.

Referring again to FIG. 3, in one embodiment, the access point may further advertise one or more digital content categories and/or digital content items that may be accessed by network devices via the access point. Accordingly, the vendor-specific information elements 360 of the management frame 300 may include the content identifier 380 specifying identifiers of one or more digital content categories and/or digital content items. The identifiers of digital content categories and/or items may be represented, e.g., by bit strings which represent index values identifying entries of a digital content catalog which associates each bit string with an alphanumeric string identifying the corresponding content category and/or content item.

Upon concluding the scanning operation, the network device may generate a scan report that lists the discovered wireless access points and their respective parameters. FIG. 5 schematically illustrates an example scan report generated by a network device operating in accordance with embodiments of the present disclosure. While the scan report 500 is shown as a rectangular table, various data structures including single or multi-dimensional arrays may be employed for storing the scan report in the memory of the network device.

As shown in FIG. 5, for every discovered wireless access point, the scan report 500 may include a respective scan report entry visually represented by a row 510A-510N of the scan report 500. Each scan report entry may include the network identifier 520, one or more physical layer (PHY) parameters 530, the basic rate set 540 specifying the data rates to be supported by a network device joining the network, the timestamp 550, and the value of network resource utilization metric 560. In one embodiment, each scan report entry may further include the content identifier 570 identifying one or more digital content categories and/or digital content items that may be accessed by network devices via the access point represented by the scan report entry. The scan report 500 may further include various other network parameters which are omitted from FIG. 5 for clarity and conciseness.

Upon generating the scan report, the network device may select an access point for association. In an illustrative example, the network device may compare the network resource utilization metric values reported by access points that have advertised the PHY layer parameters matching the parameters supported by the network device. Among those access points, the network device may select the access point that advertises the optimal (e.g., minimal or maximal) value of the network resource utilization metric.

As noted herein above, in one embodiment, the access point may further advertise one or more digital content categories and/or digital content items that may be accessed by network devices via the access point. Accordingly, the network device may select an optimal value of the metric among the values which have been provided by access points that have advertised availability of one or more requested (e.g., user-specified) digital content categories and/or digital content items.

Figure 6:
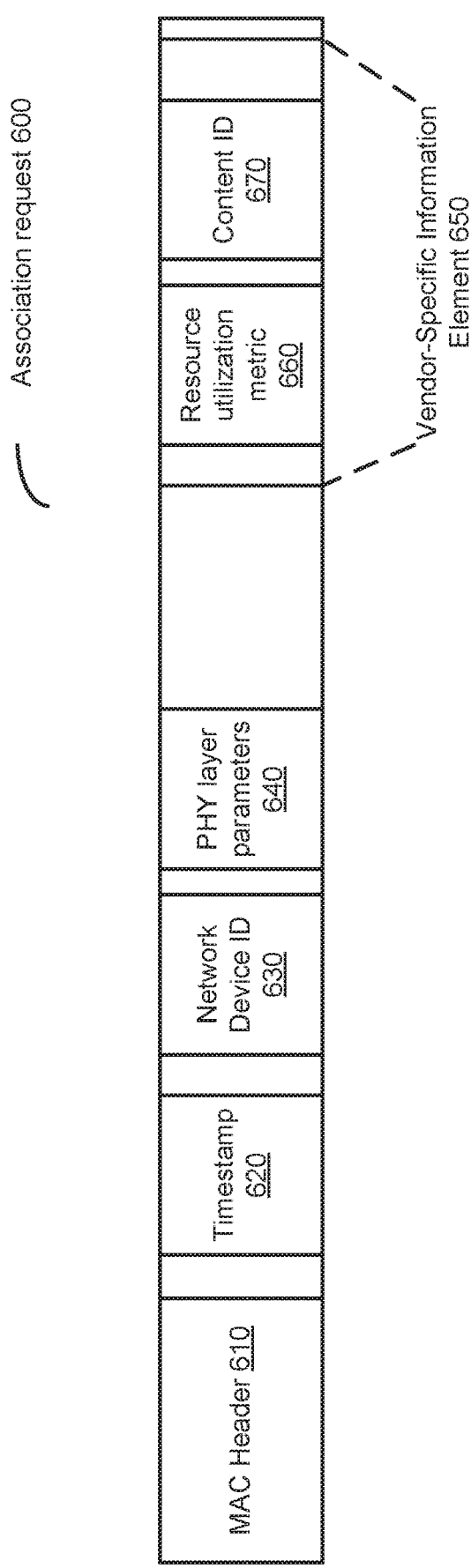
FIG. 6 schematically illustrates an example structure of an association request transmitted by a network device operating in accordance with embodiments of the present disclosure.

The network device may then initiate the association process with the selected access point. Association may be viewed as a logical equivalent of connecting a device to a wired network. In one embodiment, the association process may include authenticating the network device by the access point. Upon having been authenticated, the network device may transmit an association request to the access point. As schematically illustrated by FIG. 6, the association request 600 may include the MAC header 610 comprising the source MAC addresses (i.e., the MAC address of the network device transmitting the request) and the destination MAC address and various other fields. The association request 600 may further include the timestamp 620, the network device identifier 630 and one or more physical layer parameters 640. The association request 600 may further include various other client device parameters and/or communication parameters which are omitted from FIG. 6 for clarity and conciseness.

The association request 600 may further include one or more vendor-specific information elements 650. In one embodiment, the vendor-specific information element 650 may include the requested value 660 of the network resource utilization metric. In an illustrative example, the requested value of the resource utilization metric may reflect the requested minimal throughput rate on the network path from the access point to the network ingress device. In an illustrative example, the requested value of the resource utilization metric may reflect the requested medium utilization of the network path from the access point to the network ingress device (e.g., measured by the data transmission rate, such as the Modulation and Coding Scheme (MCS) rate).

In one embodiment, the vendor-specific information element 650 may include the content identifier 670 specifying identifiers of one or more digital content categories and/or digital content items. The identifiers of digital content categories and/or items may identify user-specified content items and/or categories, which may be represented, e.g., by bit strings which represent index values identifying entries of a catalog which associates each bit string with an alphanumeric string identifying the corresponding content category and/or content item.

The access point may process the association request and associate the requesting network device or reject the association request. In an illustrative example, the access point may compare the requested value of the resource utilization metric to the calculated value of the resource utilization metric for the network path to the network ingress device to produce a network resource availability indicator which indicates whether the requested value of the network resource utilization metric is available via the access point. The access point may then transmit, to the requesting mesh network device, an association response including a status code reflecting the network resource availability indicator: should the requested value exceed the calculated value, the access point may reject the association request, by transmitting an association response including the status code which is indicative of rejection of the association request; otherwise, the access point may accept the association request, by transmitting an association response including the status code which is indicative of acceptance of the association request. By accepting the association request, the access point records (e.g., by a record in a memory data structure) the network address (e.g., the MAC address) of the requesting network device, thus establishing an association between the access point and the network device. The access point provides the distribution services to the associated network devices (i.e., forwarding MAC service data units (MSDUs) including data and network management frames to and from the associated network devices).

In one embodiment, the access point may compare the requested content identifier with one or more content identifiers that identify content items which may be accessed by network devices via the access pointproduce a requested content availability indicator which indicates whether the requested content item is available via the access point. In one embodiment, the status code of the association response may reflect the requested content availability indicator. In an illustrative example, if the requested content is available, the status code may indicate successful association and availability of the requested content item. In another illustrative example, if the requested content is unavailable, the status code may indicate successful association and unavailability of the requested content item (in other words, the access point may still accept the association request, even though the requested content is not available, assuming that the requesting network device may utilize the association for retrieving other content items). In another illustrative example, if the requested content is unavailable, the status code may indicate rejection of the association request and unavailability of the requested content item (in other words, the access point may reject the association request because of the unavailability of the requested content item).

In one embodiment, the access point may produce the requested content availability indicator by comparing the requested content identifier with one or more category identifiers that identify content categories which may be accessed by network devices via the access point. Accordingly, the indicator would indicate whether the requested content item is available via the access point.

If the association request is granted, the access point responds with the association response that includes a status code reflecting the successful association. Accordingly, the network device may transmit, to the access point, one or more digital content requests identifying the requested digital content items. The network device may then transmit the received digital content items to the requesting client consumption device for rendering (e.g., playing back video content).

Conversely, if the association request is rejected, the access point responds with the association response that includes a status code reflecting the rejection reason. In an illustrative example, the status code may indicate that the association request has been rejected due to the requested network resource value requested exceeding the value associated with the network path to the network ingress device. In another illustrative example, the status code may indicate that the association request has been rejected due to the requested content item and/or category being unavailable through the access point that rejected the association request.

In one embodiment, the access point rejecting the association request may identify, e.g., by communicating with one or more neighboring access points, a second access point which satisfies the parameters of the association requests (e.g., the requested value of the network resource utilization metric and/or the requested content). Accordingly, the access point may transmit the association response rejecting the association request and suggesting the network device to request association with the identified second access point. The association response may include a vendor-specific information element comprising an identifier of the identified second access point, which is suggested for association with the requesting network device based on the association request parameters. Responsive to receiving the association response, the network device may transmit an association request to the second access point.

In one embodiment, the access point may later transmit a disassociation notification to the currently associated network device. The disassociation notification may include a status code indicative of disassociating the network address of the currently associated network device from the access point. In one embodiment, the disassociation notification may further identify a peer access point suggested for association by the mesh network device, as described in more details herein below. Responsive to receiving the disassociation notification, the network device may transmits an association request to the alternative access point suggested by the disassociation notification.

Figure 7:
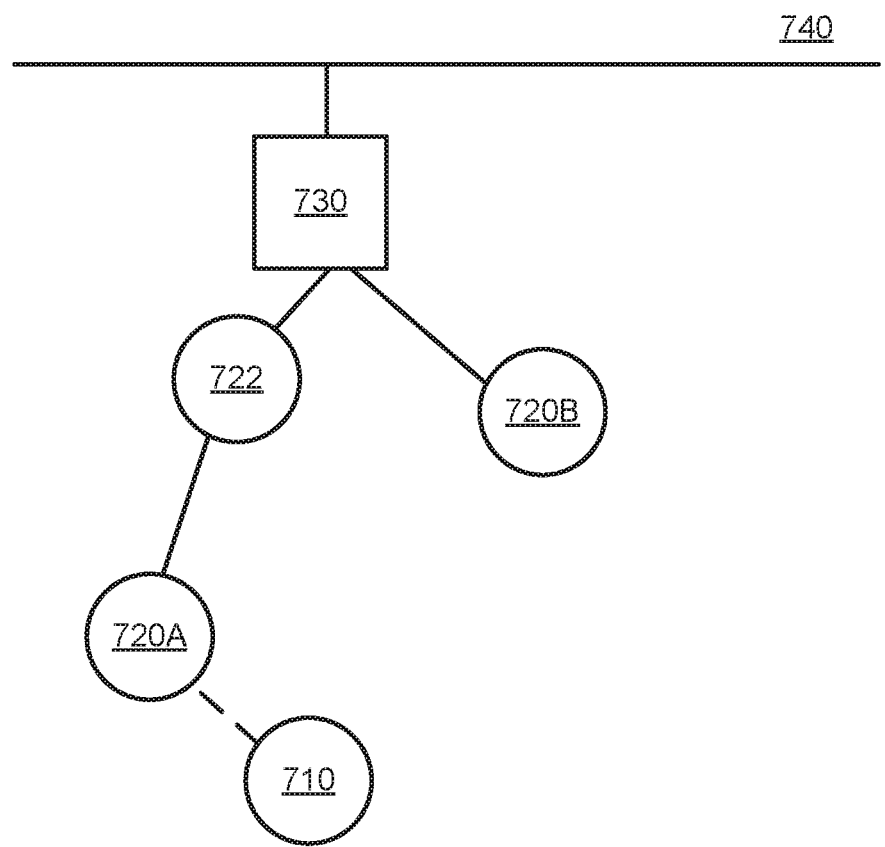
FIG. 7 schematically illustrates device-driven re-association of a network device operating in accordance with embodiments of the present disclosure.

In one embodiment, the network device may periodically repeat the scanning procedure and re-associate with another access point that advertises a better value of the network resource utilization metric if such an access point has been found. FIG. 7 schematically illustrates device-driven re-association of a network device operating in accordance with embodiments of the present disclosure. As shown in FIG. 7, the network device 710 may initially be associated with the access point 720A based on the value of the resource utilization metric advertised by the access point 720A. The resource utilization metric may reflect certain parameters of digital content delivery along a network path from the access point 720 transmitting the management frame to a network ingress device which 730 connects the mesh network by one or more wireless and/or wireline connections to a backbone network 740 in communication with one or more CDN nodes. The network path may include one or more intermediate nodes 722.

Upon receiving, from the access point 720B, a network management frame that advertises a value of the network resource utilization metric that is better (e.g., less or greater) than the stored value of the network resource utilization metric associated with the access point 720A, the network device may terminate its association with the access point 720A by transmitting a disassociation request. The network device may then transmit a re-association request to the access point 720B, thus transitioning to the access point 720B without interrupting existing network connections.

In one embodiment, the network management frame advertising the network resource utilization metric may be represented by a beacon frame which is broadcasted by the access point. In another embodiment, the network management frame advertising the network resource utilization metric may be represented by a probe response frame which is transmitted by the access point in response to a probe request frame broadcasted by the network device.

Figure 8:
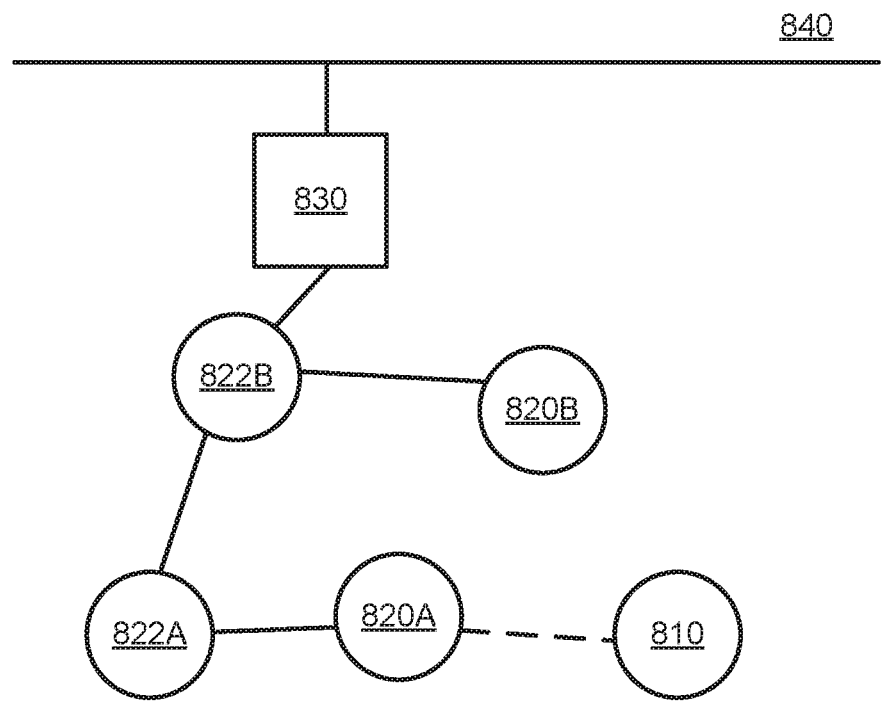
FIG. 8 schematically illustrates network-driven re-association of a network device operating in accordance with embodiments of the present disclosure.

In one embodiment, the access points operating in accordance with embodiments of the present disclosure may implement network-driven re-association of a network device. FIG. 8 schematically illustrates network-driven re-association of a network device operating in accordance with embodiments of the present disclosure. As schematically illustrated by FIG. 8, the network device 810 may initially be associated with the access point 820A based on the value of the resource utilization metric advertised by the access point 820A. The resource utilization metric may reflect certain parameters of digital content delivery along a network path from the access point 820 transmitting the management frame to a network ingress device which 830 connects the mesh network by one or more wireless and/or wireline connections to a backbone network 840 in communication with one or more CDN nodes. The network path may include one or more intermediate nodes 822.

In one embodiment, the access point 820B may be located within the radio transmission range of both the network device 810 and the access point 820A. Therefore, the access point 820B may receive the network management frames transmitted by the access point 820A advertising the value of the network resource utilization metric on the network path from the access point 820A to the network ingress device 830. The access point 820B may also receive the association request transmitted by the network device 810 to the access point 820A and the corresponding association response transmitted by the access point 820A.

In an illustrative example, the access point 820B may determine that the value of the network resource utilization metric on the network path from the access point 820B to the network ingress device 830 is better than the value of the network resource utilization metric advertised by the access point 820A. Accordingly, the access point 820B may transmit a message notifying the access point 820A of the value of the network resource utilization metric on the network path from the access point 820B to the network ingress device 830. Responsive to receiving the notification, the access point 820A may disassociate the network device 810 by transmitting a network management frame including a disassociation notification. In an illustrative example, the disassociation notification may include a status code indicative of disassociating the network address of the previously associated network device from the access point 820A.

In one embodiment, the network management frame carrying the disassociation notification may further include a vendor-specific information element comprising an identifier of the identified access point 820B and the value of the resource utilization metric advertised by the access point

820B. Responsive to receiving the disassociation notification from the access point 820A, the network device 810 may transmit an association request to the access point 820B.

In one embodiment, the association request transmitted by the network device 810 to the access point 820A, which has also been received by the access point 820B, may include identifiers of one or more digital content categories and/or digital content items. Accordingly, the access point 820B may, in anticipation of the network device 810 association, start pre-fetching the identified content from one or more CDN nodes.

In another illustrative example, the access point 820A may receive, from the mesh network control service (not shown in FIG. 8), a notification identifying the access point 820B as satisfying the parameters of the initial client's association request (e.g., the requested value of the network resource utilization metric and/or the requested content) and providing a better value of the network resource utilization metric than the value that has been advertised by the access point 820A. Responsive to receiving the notification, the access point 820A may disassociate the network device 810 by transmitting a network management frame including a disassociation notification. The network management frame may include a vendor-specific information element comprising an identifier of the identified access point 820B and the value of the resource utilization metric advertised by the access point 820B. Responsive to receiving the disassociation notification from the access point 820A, the network device 810 may transmit an association request to the access point 820B.

In another illustrative example, the access point 820A may receive a network management frame (e.g., a beacon or a probe response) transmitted by the access point 820B which advertises a better value of the network resource utilization metric than that of the access point 820A. Accordingly, the access point 820A may disassociate the network device 810 by transmitting a network management frame including a disassociation notification. The network management frame may include a vendor-specific information element comprising an identifier of the identified access point 820B and the value of the resource utilization metric advertised by the access point 820B. Responsive to receiving the disassociation notification from the access point 820A, the network device 810 may transmit an association request to the access point 820B.

In order to determine a network path to a network ingress device which connects the mesh network by one or more wireless and/or wireline connections to a backbone network in communication with one or more CDN nodes, an access point operating in accordance with embodiments of the present disclosure may implement one or more path selection methods to discover network paths to one or more network ingress devices. If more than one path exists between the source and destination nodes, the network path having the minimal value of a network path selection metric may be selected. In one embodiment, the network path selection metric may reflect the time of delivering the frame along the corresponding network path.

Figure 9:
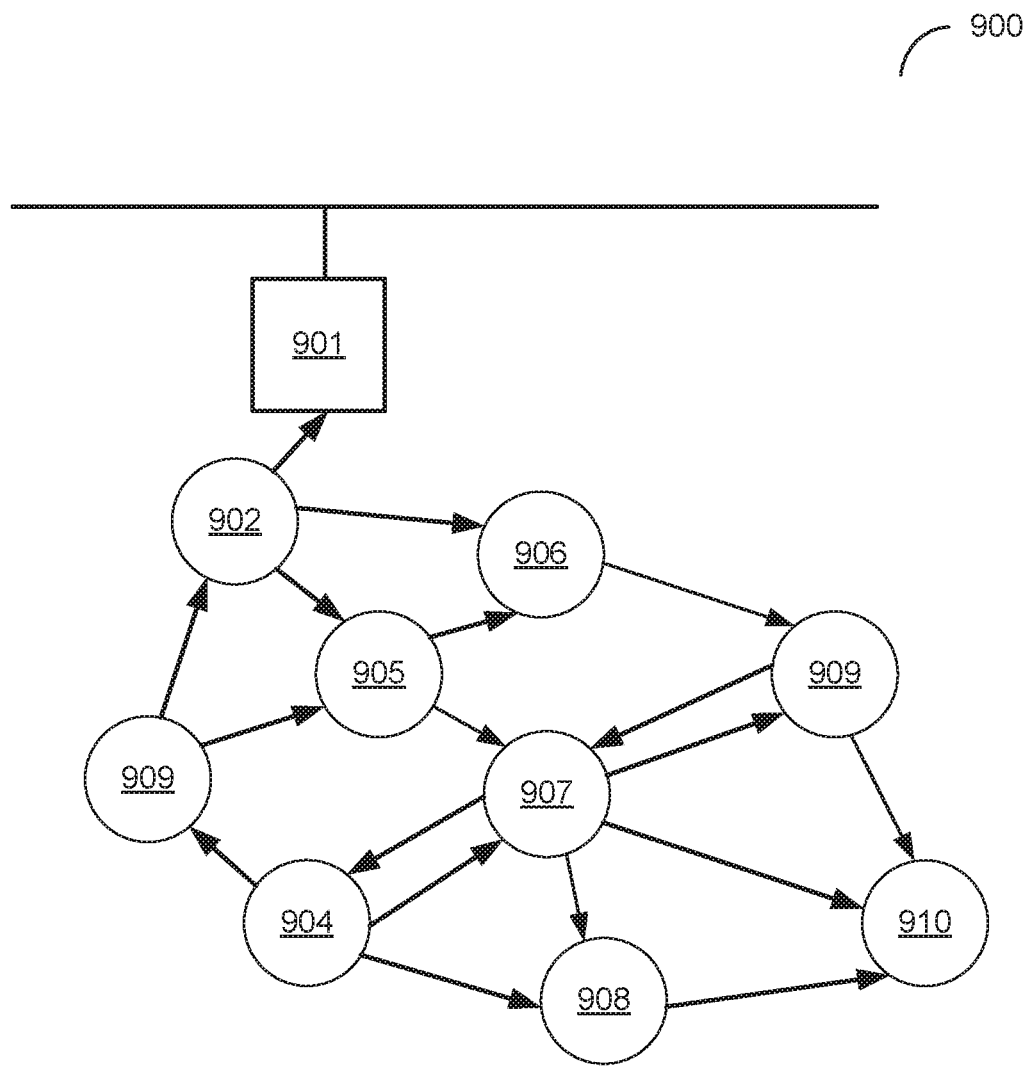
FIG. 9 schematically illustrates one embodiment of a path selection method implemented by a wireless mesh network operating in accordance with embodiments of the present disclosure.

FIG. 9 schematically illustrates one embodiment of a path selection method implemented by a wireless mesh network operating in accordance with embodiments of the present disclosure. As shown in FIG. 9, the wireless mesh network 900 may include nodes 901-910. The source node (e.g., the access point 904) may employ the dynamic path selection mode to find a path to the destination node (e.g., a network ingress device 901). In an illustrative example, the source node may broadcast a network management frame including a route request (RREQ) information element specifying the network ingress device 901 as the destination node (e.g., using the MAC address of the destination node 909) and initializing the metric field to zero. Responsive to receiving a RREQ, an intermediate node (e.g., a node 907, 908, or 909) may increment the metric field of the RREQ to reflect the airtime of the last hop leading to this node. The intermediate node may then create a route to the source node (e.g., access point 904) or update an existing route to the source node, and re-broadcast the RREQ by forwarding it to its neighboring nodes. Thus, whenever an intermediate node forwards a RREQ, the metric field in the RREQ will be updated to reflect the cumulative metric of the route to the source of the RREQ.

Responsive to receiving a RREQ, the destination node (e.g., the network ingress device 901) may increment the metric field of the RREQ to reflect the airtime of the last hop leading to the destination node. The destination node may then select, among a plurality of candidate network paths between the source node (e.g., the access point 904) and the destination node, the network path having a minimal value of the network path selection metric. In one embodiment, RREQ and RREP information elements transmitted by the network nodes may further specify the value of the network resource utilization metric. The destination node may send, back to the source node, a unicast route reply (RREP) specifying the value of the network resource utilization metric.

Responsive to receiving a network management frame including the RREP information element specifying the destination, an intermediate node (e.g., a node 907, 908, or 909) may create or update a route to the destination node (e.g., the network ingress device 901) and forward the RREP towards the source node (e.g., the access point 904). Upon receiving the RREP, the source node may create a route to the destination node. Upon receiving further RREQs specifying the same source node with a metric value better than the existing route, the destination node may update its route to the source node and send a new RREP to the source node along the updated route. Participating network nodes may store the created and/or updated routes in their respective routing tables.

Figure 10:
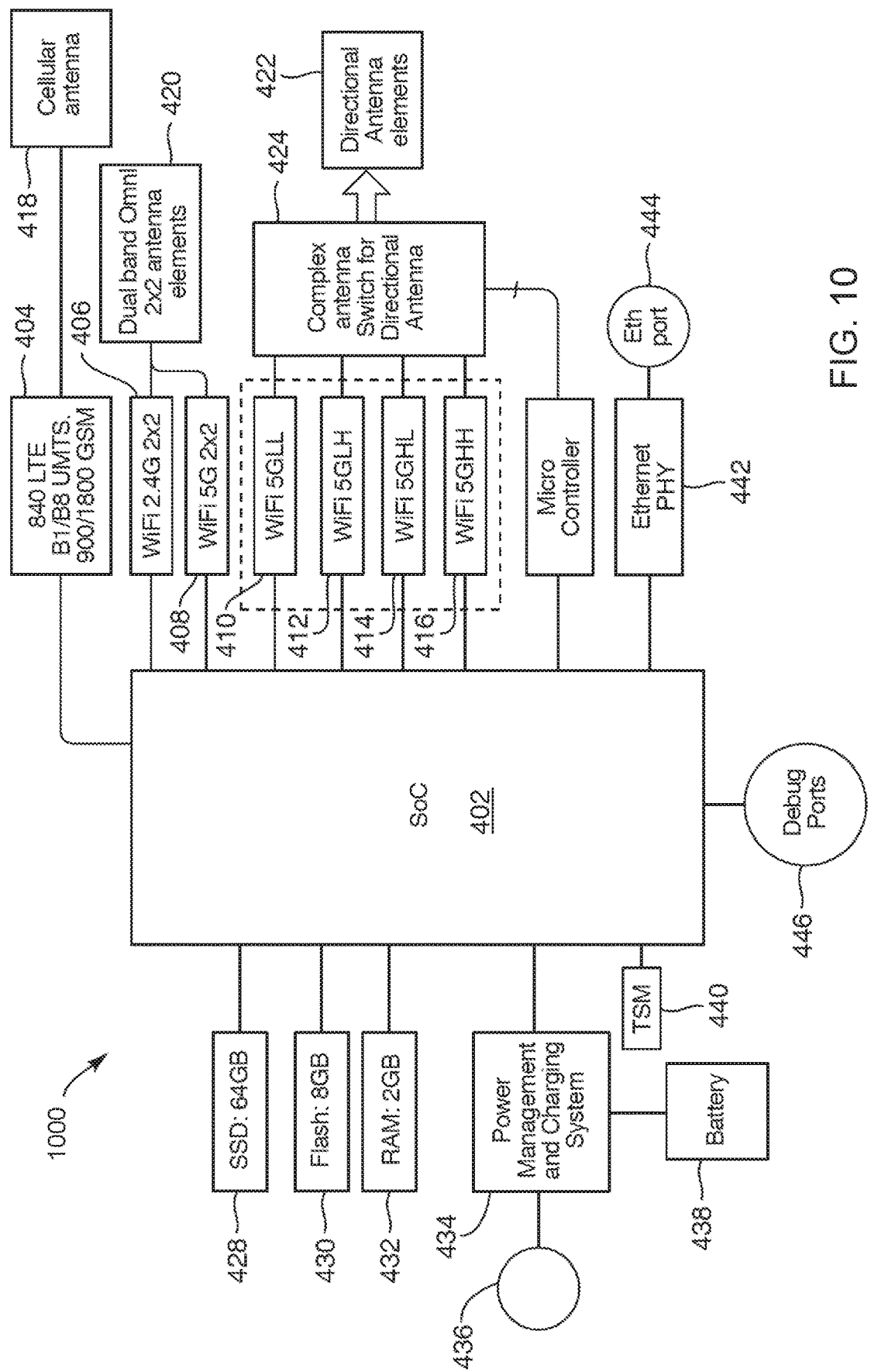
FIG. 10 is a block diagram of an example network device operating in accordance with embodiments of the present disclosure.

FIG. 10 is a block diagram of an example network device 1000 operating in accordance with embodiments of the present disclosure. The network device 1000 may be one of many network devices organized in a wireless mesh network (e.g., wireless mesh network 100). The network device 1000 is one of the nodes in a wireless mesh network in which the network device 1000 cooperates with other network devices in distribution of content files to client consumption devices in an environment of limited connectivity to broadband Internet infrastructure, as described herein. The network device 1000 may be the mini-POP node 102 of FIG. 1. Alternatively, the network device 1000 may be any one of the network devices 104-110 of FIG. 1. In another embodiment, the network device 1000 is any one of the network nodes 210-230 of FIG. 2.

The network device 1000 includes a system on chip (SoC) 402 to process data signals in connection with communicating with other network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A151.5 GHz with hardware network acceleration.

The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ40210 Qualcomm SoC. Alternatively, other types of SoCs may be used, such as the Annapurna SoC, or the like. Alternatively, the network device 1000 may include an application processor that is not necessarily considered to be a SoC.

The network device 1000 may also include memory and storage. For example, the network device 1000 may include SSD 64 GB 428, 8 GB Flash 430, and 2 GB 432. The memory and storage may be coupled to the SoC 402 via one or more interfaces, such as USB 3.0, SATA, or SD interfaces. The network device 1000 may also include a single Ethernet port 444 that is an ingress port for IP connection. The Ethernet port 444 is connected to the Ethernet PHY 442, which is connected to the SoC 402. The Ethernet port 444 can be used to service the network device 1000. Although the Ethernet port 444 could provide wired connections to client devices, the primary purpose of the Ethernet port 444 is not to connect to client devices, since the 2.4 GHz connections are used to connect to clients in the WMN. The network device 1000 may also include one or more debug ports 446, which are coupled to the SoC 402. The memory and storage may be used to cache content, as well as store software, firmware or other data for the network device 1000.

The network device 1000 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the network device 1000, such as for 10 minutes before the entire system is completely powered down. In some cases, power outage will likely affect a geographic area in which the network device 1000 is deployed (e.g., power outage that is a neighborhood wide phenomenon). The best option may be to power down the network device 1000 and let the cloud service (e.g., back end service) know of the outage in the WMN. The power management and charging system 434 may provide a 15V power supply up to 21 watts to the SoC 402. Alternatively, the network device 1000 may include more or less components to operate the multiple antennas as described herein.

The network device 1000 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 1000 MHz band and 11000 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 1000/11000. The modem may or may not support CDMA. The cellular modem may be used for diagnostics, network management, down time media caching, meta data download, or the like. Alternatively, the first RF module 404 may support other bands, as well as other cellular technologies. The network device 1000 may include a GPS antenna and corresponding GPS module to track the location of the network device 1000, such as moves between homes. However, the network device 1000 is intended to be located inside a structure, the GPS antenna and module may not be used in some embodiments.

The network device 1000 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2×2 MU-MIMO streams).

The network device 1000 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other network devices of the WMN. The antenna switching circuitry 424 is coupled to a micro controller 426. The micro controller 426 controls the antenna switching circuitry 424 to select different combinations of antennas for wireless communications between the network device 1000 and the other network devices, the client consumption devices, or both. For example, the micro controller 426 can select different combinations of the set of directional antennas 422. In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first a first 2×2 2.4 GHz MIMO radio 406 and a 2×2 5 GHz MIMO radio 408. The second set of WLAN modules includes a first 2×2 5 GHz MIMO radio 410 ("SGLL"), a second 2×2 5 GHz MIMO radio 412 ("5GLH"), a third 2×2 5 GHz MIMO radio 414 ("5GHL"), and a fourth 2×2 5 GHz MIMO radio 416 ("5GHH"). The dual-band omnidirectional antennas 420 may include a first omnidirectional antenna and a second omnidirectional antenna (not individually illustrated in FIG. 10). The set of directional antennas 422 includes: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the network device 1000 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the network device 1000 may be based on CSMA-CA, not TDMA. Deciding where the data will be coming into the network device 1000 is not known prior to receipt, so dynamic switching may not add much benefit. It should also be noted that network backbone issues, such as one of the network devices becoming unavailable, may trigger another neighbor sounding process to determine a new switch configuration. Once the neighbor sounding process is completed, the network device 1000 can adapt a beam patter to be essentially fixed since the network devices are not intended to move once situated.

In one embodiment, the antenna switching circuitry 424 includes multiple diplexers and switches to connect different combinations of antennas to the multiple radios. One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the network device 1000.

Figure 11:
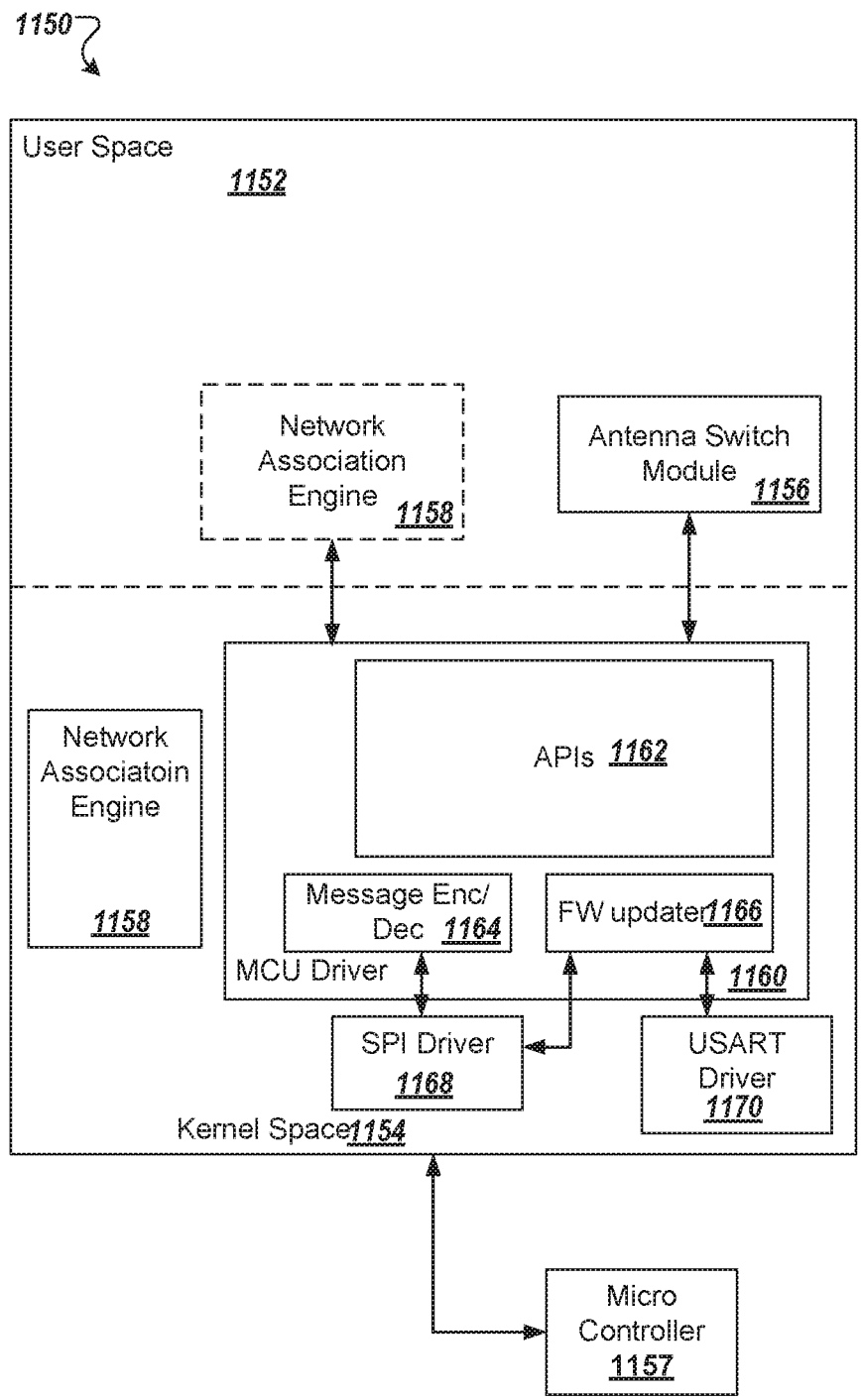
FIG. 11 is a block diagram of an application processor in which the network association engine operating in accordance with embodiments of the present disclosure may be implemented.

FIG. 11 is a block diagram of an application processor in which the network association engine operating in accordance with embodiments of the present disclosure may be implemented. The application processor 1150 executes an operating system that segregates memory (virtual memory) into user space 1152 and kernel space 1154. In this embodiment, network association engine 1158 runs in the user space 1152. In other embodiments, some or the entire network association engine 1158 can be implemented in the kernel space 1154. The network association engine 1158 may be instructions that when executed by the application processor 1150 perform various network path selection operations as described below with respect to FIGS. 11-12. The network association engine 1158 can perform the access point selection methods described herein. The application processor 1150 can communicate with neighbor network devices to route data traffic on a network backbone of multiple P2P wireless connections between the network devices.

In the kernel space 1154, a micro controller unit (MCU) driver 1160 can execute. The MCU driver 1160 may include multiple application programming interfaces (APIs) 1162 to interface to other components, such as the radios and micro controller, as described herein. The APIs 1162 can communicate messages to other components and may use a message encoder/decoder 1164 to encode and decode these messages. The APIs 1162 may include an API for getting firmware versions, an API for updating the firmware, and an API for getting radio information (e.g., radio configuration, antenna configuration, channel information, chamber/sector information, or the like). The MCU driver 1160 may also include a firmware (FW) updater 1166. Also, the kernel space 1154 may include a serial packet interface (SPI) driver 1168 and a Universal Synchronous/Asynchronous Receiver/Transmitter (USART) driver 1170.

In one embodiment, there is an interface mechanism between the user space 1152 and kernel space 1154 that has minimum latency. For example, in cases when there is an invalid configuration being input by an application, such as the network association engine 1158, the error should be reported as quickly as possible to the application. The application processor 1150 may also include power management modules in the user space 1152 or in the kernel space 1154 since the application processor 1150 could be operating in a battery-backed operating state during power outages.

Figure 12:
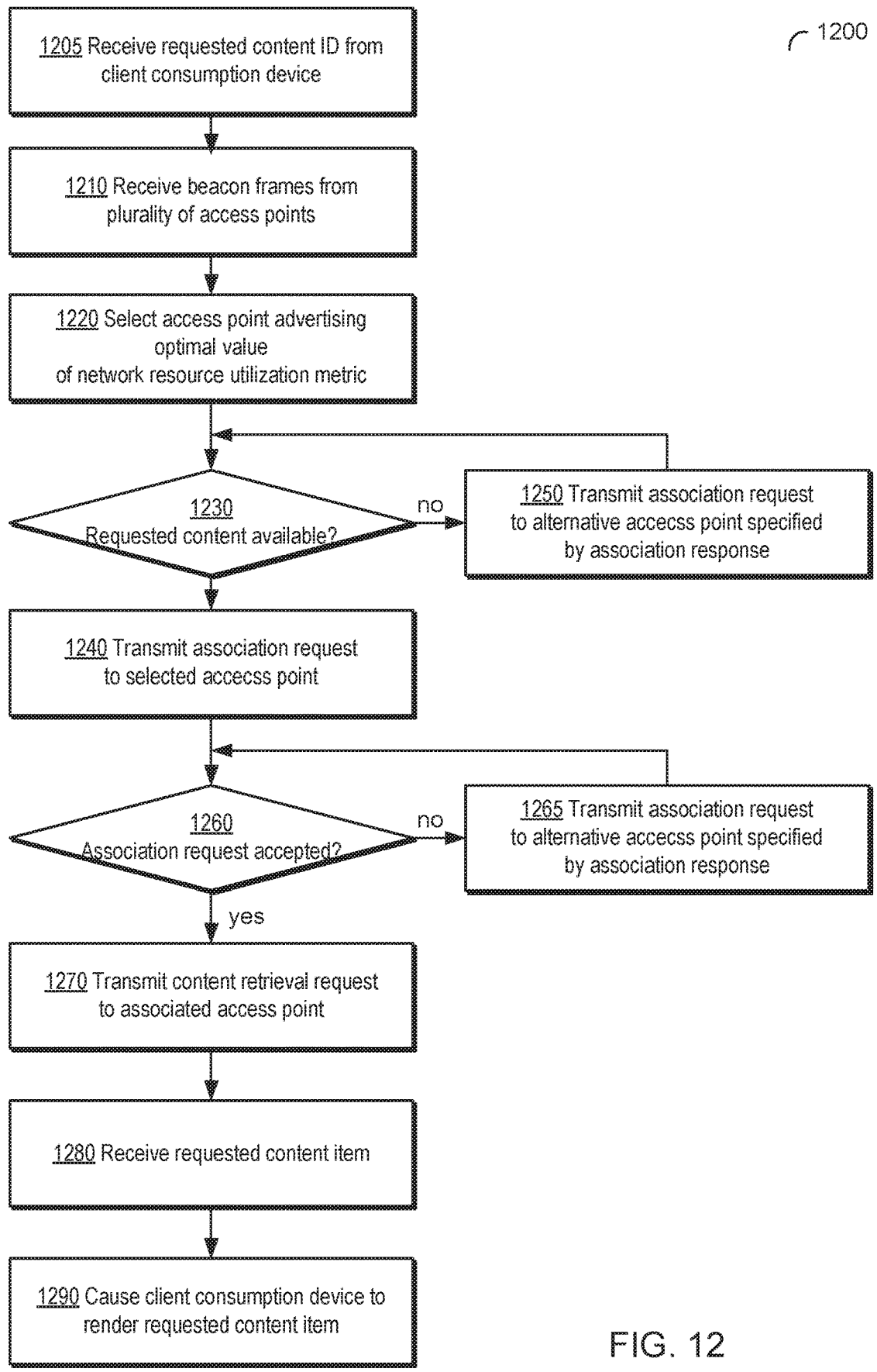
FIG. 12 is a flow diagram of one embodiment of a method selecting an access point for association by a network device operating in accordance with embodiments of the present disclosure.

FIG. 12 is a flow diagram of one embodiment of a method of selecting an access point for association by a network device operating in accordance with embodiments of the present disclosure. The method 1200 may be performed by processing logic that includes hardware (e.g., circuitry, dedicated logic, programmable logic, microcode, etc.), software (e.g., instructions run on a processor to perform hardware simulation), or a combination thereof. In one embodiment, the method 1200 may be performed by any one of the network devices 108-120 of FIG. 1. Alternatively, the method 1200 may be performed by any one of the network nodes 210-230 of FIG. 2. Alternatively, the method 1200 may be performed by the network device 1000 of FIG. 10. Alternatively, the method 1200 may be performed by the application processor 1150 of FIG. 11.

Referring to FIG. 12, at block 1205, the network device may receive, from a client consumption device (e.g., represented by the client consumption device 112, 144, 116 of FIG. 1), an identifier of a requested digital content item to be rendered by the client consumption device (e.g., responsive to a user interface command selecting the digital content item for rendering).

At block 1210, the network device may receive network management frames (e.g., beacon frames or probe response frames) from several access points located within the radio transmission range of the network device. Each management frame may include a vendor-specific information element specifying a value of the network resource utilization metric. The metric may reflect certain parameters of digital content delivery along a network path from the access point transmitting the management frame to a network ingress device which connects the mesh network by one or more wireless and/or wireline connections to a backbone network in communication with one or more CDN nodes. In one embodiment, each management frame may further include a vendor-specific information element specifying one or more content identifier identifying digital content categories and/ or digital content items that may be accessed by network devices via the access point that has transmitted the management frame.

At block 1220, the network device may select the access point that advertises the optimal (e.g., minimal or maximal) value of the network resource utilization metric. In one embodiment, the network device may select an optimal value of the metric among the values which have been reported by access points that have advertised availability of one or more desired digital content categories and/or digital content items, as described in more detail herein above. In an illustrative example, among two received beacon frames, the network device may choose the beacon frame that advertised the network utilization metric value exceeding the metric value advertised by the other beacon frame. Accordingly, the network device may select the access point that transmitted the chosen beacon frame.

Responsive to determining, at block 1230, that the requested (e.g., user-specified) content item and/or content category is available from the selected access point, processing may continue at block 1240; otherwise, the method may branch to block 1250 to select the access point that advertises the next optimal (e.g., minimal or maximal) value of the network resource utilization metric, and the method may loop back to block 1230.

At block 1240, the network device may transmit an association request to the selected access point. In one embodiment, the association request may specify the requested value of the network resource utilization metric. In an illustrative example, the requested value of the resource utilization metric may reflect the requested minimal throughput rate on the network path from the access point to the network ingress device. In another illustrative example, the requested value of the resource utilization metric may reflect the requested medium utilization of the network path from the access point to the network ingress device (e.g., measured by the data transmission rate, such as the MCS rate).

In one embodiment, the association request may specify one or more identifiers of digital content categories and/or digital content items, as described in more detail herein above.

At block 1260, the network device may analyzer the association response received from the access point. In an illustrative example, the association response may include a successful association status code, which indicates successful association of the network address of the network device with the access point. Responsive to receiving, at block 1260, an association response accepting the association request, the network device may, at block 1270, transmit a content retrieval request to the access point. In an illustrative example, the content retrieval request may be represented by a HyperText Transfer Protocol (HTTP) request.

In another illustrative example, the association response may include a status code indicative of rejection of the association request. Responsive to receiving, at block 1260, an association response rejecting the association request, the network device may, at block 1265, transmit an association request to an alternative access point specified by the association response, as described in more detail herein above, and the method may loop back to block 1260.

At block 1280, the network device may receive the requested digital content item from the access point. In an illustrative example, the digital content item request may be transmitted by an HTTP response responsive to the HTTP request of block 1260.

At block 1290, the network device may transmit the requested digital content item to the client consumption device which requested the digital content item, and the method may terminate.

Figure 13:
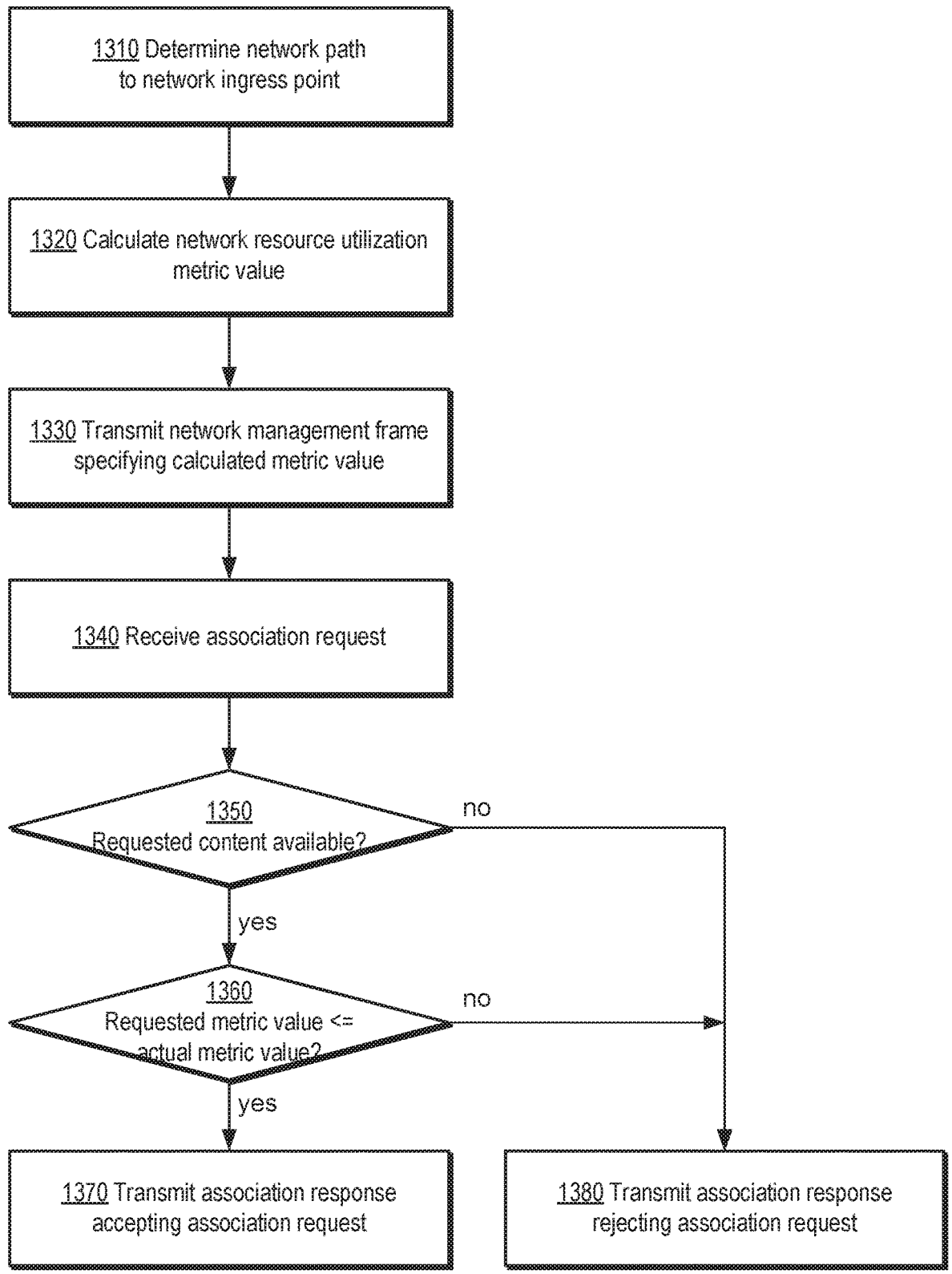
FIG. 13 is a flow diagram of one embodiment of a method of associating a network device by an access point operating in accordance with embodiments of the present disclosure.

FIG. 13 is a flow diagram of one embodiment of a method of associating a network device by an access point operating in accordance with embodiments of the present disclosure. The method 1300 may be performed by processing logic that includes hardware (e.g., circuitry, dedicated logic, programmable logic, microcode, etc.), software (e.g., instructions run on a processor to perform hardware simulation), or a combination thereof. In one embodiment, the method 1300 may be performed by any one of the network devices 108-130 of FIG. 1. Alternatively, the method 1300 may be performed by any one of the network nodes 210-230 of FIG. 2. Alternatively, the method 1300 may be performed by the network device 1000 of FIG. 10. Alternatively, the method 1300 may be performed by the application processor 1150 of FIG. 11.

Referring to FIG. 13, at block 1310, the access point implementing the method may determine a network path to a network ingress device which connects the mesh network by one or more wireless and/or wireline connections to a backbone network in communication with one or more CDN nodes.

At block 1320, the access point may calculate the value of the network resource utilization metric that reflects certain parameters of digital content delivery along the network path. In an illustrative example, the network resource utilization metric may reflect the number of network hops on the network path. In another illustrative example, the network resource utilization metric may reflect the latency of the network path. In another illustrative example, the network resource utilization metric may reflect the total power consumption by mesh nodes on the network path. In another illustrative example, the network resource utilization metric may reflect the minimum throughput supported by the network path. In another illustrative example, the network resource utilization metric may reflect the minimum, among the hops, medium utilization. In another illustrative example, the network resource utilization metric may reflect the minimum remaining battery life of network nodes on the network path, as described in more detail herein above.

At block 1330, the access point may transmit one or more network management frames (e.g., beacon or probe response frames) specifying the calculated metric value. In one embodiment, the network management frames may further specify one or more content identifiers identifying one or more digital content categories and/or digital content items that may be accessed by network devices via this access point, as described in more detail herein above.

At block 1340, the access point may receive an association request from a network device. In one embodiment, the association request may specify the requested value of the network resource utilization metric. In an illustrative example, the requested value of the resource utilization metric may reflect the requested minimal throughput rate on the network path from the access point to the network ingress device. In another illustrative example, the requested value of the resource utilization metric may reflect the requested medium utilization of the network path from the access point to the network ingress device (e.g., measured by the data transmission rate, such as the MCS rate).

In one embodiment, the association request may specify one or more identifiers of digital content categories and/or digital content items, as described in more detail herein above.

Responsive to determining, at block 1350, that the requested content is available from a CDN node that is reachable via the network ingress device, the processing may continue at block 1360; otherwise, the method may branch to block 1380.

Responsive to determining, at block 1360, that the requested metric value does not exceed the calculated actual metric value, the access point may, at block 1370, transmit an association response accepting the association request; otherwise, the method may branch to block 1380.

At block 1380, the access point may transmit, to the requesting network device, an association response rejecting the association request. In one embodiment, the association response may include a vendor-specific information element comprising an identifier of a peer access point, which is suggested for association with the requesting network device based on the association request parameters, as described in more detail herein above. Responsive to completing the operations of block 1380, the method may terminate.

Figure 14:
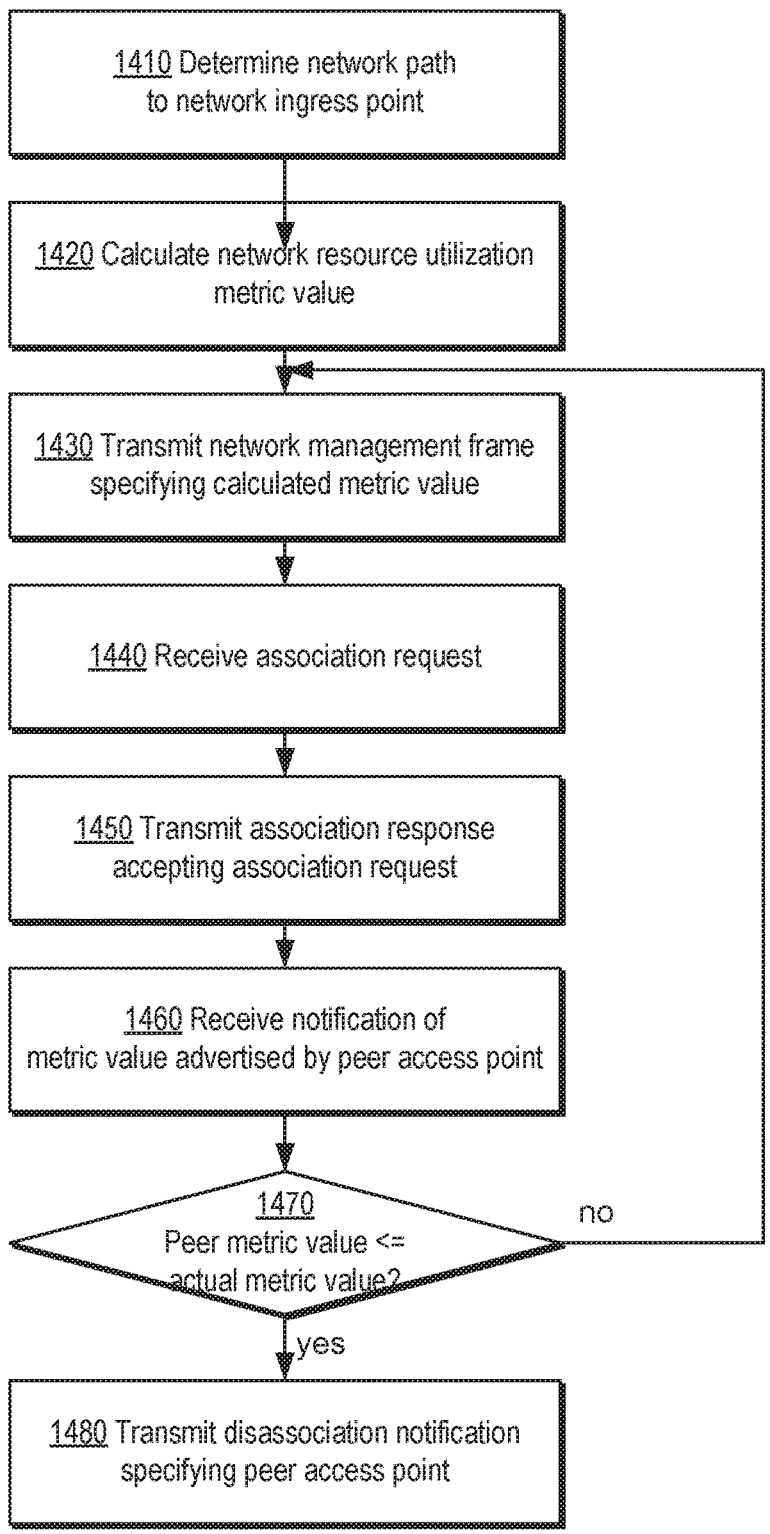
FIG. 14 is a flow diagram of one embodiment of a method of disassociating a network device by an access point operating in accordance with embodiments of the present disclosure.

FIG. 14 is a flow diagram of one embodiment of a method of disassociating a network device by an access point operating in accordance with embodiments of the present disclosure. The method 1400 may be performed by processing logic that includes hardware (e.g., circuitry, dedicated logic, programmable logic, microcode, etc.), software (e.g., instructions run on a processor to perform hardware simulation), or a combination thereof. In one embodiment, the method 1400 may be performed by any one of the network devices 108-140 of FIG. 1. Alternatively, the method 1400 may be performed by any one of the network nodes 210-230 of FIG. 2. Alternatively, the method 1400 may be performed by the network device 1000 of FIG. 10. Alternatively, the method 1400 may be performed by the application processor 1150 of FIG. 11.

Referring to FIG. 14, at block 1410, the access point implementing the method may determine a network path to a network ingress device which connects the mesh network by one or more wireless and/or wireline connections to a backbone network in communication with one or more CDN nodes.

At block 1420, the access point may calculate the value of the network resource utilization metric that reflects certain parameters of digital content delivery along the network path. In an illustrative example, the network resource utilization metric may reflect the number of network hops on the network path. In another illustrative example, the network resource utilization metric may reflect the latency of the network path. In another illustrative example, the network resource utilization metric may reflect the total power consumption by mesh nodes on the network path. In another illustrative example, the network resource utilization metric may reflect the minimum throughput supported by the network path. In another illustrative example, the network resource utilization metric may reflect the minimum, among the hops, medium utilization. In another illustrative example, the network resource utilization metric may reflect the minimum remaining battery life of network nodes on the network path, as described in more detail herein above.

At block 1430, the access point may transmit one or more network management frames (e.g., beacon or probe response frames) specifying the calculated metric value. In one embodiment, the network management frames may further specify one or more content identifiers identifying one or more digital content categories and/or digital content items that may be accessed by network devices via this access point, as described in more detail herein above.

At block 1440, the access point may receive an association request from a network device. In one embodiment, the association request may specify the requested value of the network resource utilization metric. In an illustrative example, the requested value of the resource utilization metric may reflect the requested minimal throughput rate on the network path from the access point to the network ingress device. In another illustrative example, the requested value of the resource utilization metric may reflect the requested medium utilization of the network path from the access point to the network ingress device (e.g., measured by the data transmission rate, such as the MCS rate).

In one embodiment, the association request may specify one or more identifiers of digital content categories and/or digital content items, as described in more detail herein above.

At block 1450, the access point may transmit an association response accepting the association request, as described in more detail herein above.

At block 1460, the access point may receive a notification of a network utilization metric value advertised by a peer access point. In an illustrative example, the notification may be originated by the mesh network control service. In another illustrative example, the access point may receive network management frames transmitted by the peer access point advertising the value of the network resource utilization metric.

Responsive to determining, at block 1470, that the metric value advertised by the peer access point is better than its own metric value, the access point implementing the method may, at block 1480, transmit a disassociation notification to the currently associated client device. In an illustrative example, the disassociation notification may include a status code indicative of disassociating the network address of the associated network device from the access point. In one embodiment, the disassociation notification may include a vendor-specific information element comprising an identifier of a peer access point, which is suggested for association with the requesting network device based on comparing the advertised metric values, as described in more detail herein above. Responsive to completing the operations of block 1480, the method may terminate.

Figure 15:
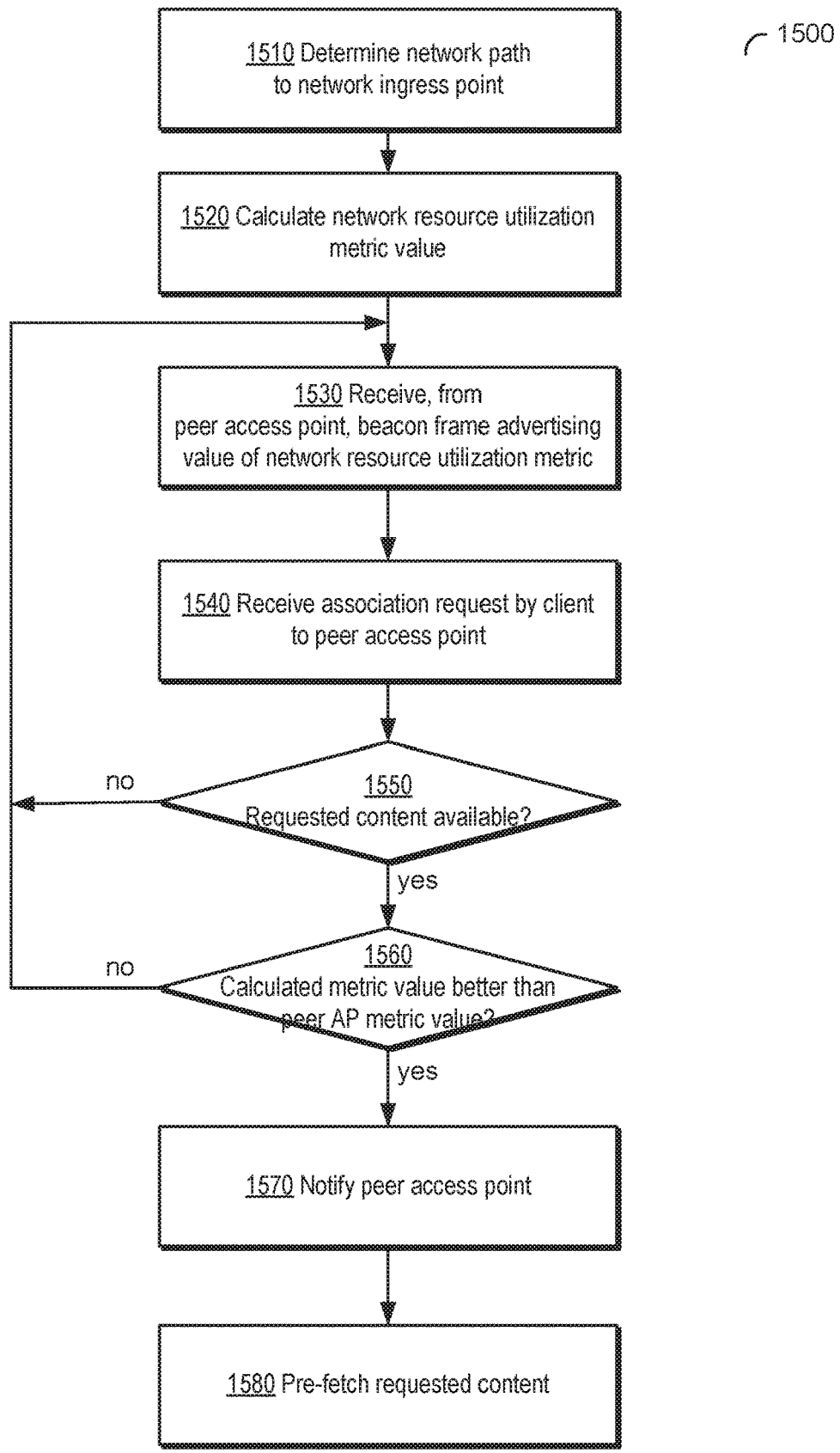
FIG. 15 is a flow diagram of one embodiment of a method of re-associating a network device by an access point operating in accordance with embodiments of the present disclosure.

FIG. 15 is a flow diagram of one embodiment of a method of re-associating a network device by an access point operating in accordance with embodiments of the present disclosure. The method 1500 may be performed by processing logic that includes hardware (e.g., circuitry, dedicated logic, programmable logic, microcode, etc.), software (e.g., instructions run on a processor to perform hardware simulation), or a combination thereof. In one embodiment, the method 1500 may be performed by any one of the network devices 108-150 of FIG. 1. Alternatively, the method 1500 may be performed by any one of the network nodes 210-230 of FIG. 2. Alternatively, the method 1500 may be performed by the network device 1000 of FIG. 10. Alternatively, the method 1500 may be performed by the application processor 1150 of FIG. 11.

Referring to FIG. 15, at block 1510, the access point implementing the method may determine a network path to a network ingress device which connects the mesh network by one or more wireless and/or wireline connections to a backbone network in communication with one or more CDN nodes.

At block 1520, the access point may calculate the value of the network resource utilization metric that reflects certain parameters of digital content delivery along the network path. In an illustrative example, the network resource utilization metric may reflect the number of network hops on the network path. In another illustrative example, the network resource utilization metric may reflect the latency of the network path. In another illustrative example, the network resource utilization metric may reflect the total power consumption by mesh nodes on the network path. In another illustrative example, the network resource utilization metric may reflect the minimum throughput supported by the network path. In another illustrative example, the network resource utilization metric may reflect the minimum, among the hops, medium utilization. In another illustrative example, the network resource utilization metric may reflect the minimum remaining battery life of network nodes on the network path, as described in more detail herein above.

At block 1530, the access point may receive a network management frame transmitted by a peer access point. In one embodiment, the management frame may specify a resource utilization metric value on a network path from the access point that has transmitted the management frame to a network ingress device. In one embodiment, the network management frames may further specify one or more content identifiers identifying one or more digital content categories and/or digital content items that may be accessed by network devices via the access point that has transmitted the network management frame, as described in more detail herein above.

At block 1540, the access point may receive an association request transmitted by a network device to the peer access point. In one embodiment, the association request may specify the requested value of the network resource utilization metric. In an illustrative example, the requested value of the resource utilization metric may reflect the requested minimal throughput rate on the network path from the access point to the network ingress device. In another illustrative example, the requested value of the resource utilization metric may reflect the requested medium utilization of the network path from the access point to the network ingress device (e.g., measured by the data transmission rate, such as the MCS rate).

In one embodiment, the association request may specify one or more identifiers of digital content categories and/or digital content items, as described in more detail herein above.

Responsive to determining, at block 1550, that the requested content is available from a CDN node that is reachable by this access point via a network ingress device, the processing may continue at block 1560; otherwise, the method may loop back to block 1530.

Responsive to determining, at block 1560, that the calculated metric value is better than the metric value advertised by the peer access point, the access point implementing the method may, at block 1570, transmit a message notifying the peer access point of the metric value and content availability; otherwise, the method may loop back to block 1530.

At block 1570, the access point implementing the method may, in anticipation of association with the network device which is currently associated with the peer access point, start pre-fetching, from one or more CDN nodes, the content identified by the association request that the client network device has previously transmitted to the peer access point. Responsive to completing the operations of block 1580, the method may terminate.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method, comprising:
   determining, by a first access point of a wireless mesh network comprising an ingress device, a network path from the first access point to the ingress device;
   determining a first value of a network resource utilization metric reflecting a characteristic of data frame transmission along the network path;
   transmitting a network management frame including the first value;
   receiving, from a mesh network device of the wireless mesh network, an association request including a second value for the network resource utilization metric and a content identifier of a requested digital content item;
   comparing the second value and the first value to produce a network resource availability indicator;
   transmitting, to the mesh network device, an association response including a status code reflecting the network resource availability indicator; and
   fetching the requested digital content item from a content distribution node.

2. The method of claim 1, further comprising:
   determining that the second value exceeds the first value; and
   wherein the status code is indicative of rejection of the association request.

3. The method of claim 1, further comprising:
   determining that the second value exceeds the first value; and
   wherein the association response identifies a second access point suggested for association by the mesh network device.

4. The method of claim 1, further comprising:
   determining that the second value is less than or equal to the first value; and
   wherein the status code is indicative of acceptance of the association request.

5. The method of claim 1, further comprising:
   receiving, from a network management service, a first content identifier of a first digital content item that is available via the first access point; and
   producing a requested content availability indicator by comparing the content identifier of the requested digital content item to the first content identifier;
   wherein the status code is further indicative of the requested content availability indicator.

6. The method of claim 1, further comprising:
   receiving, from a network management service, a category identifier of a digital content category that is available via the first access point; and
   producing a requested content availability indicator by comparing the content identifier of the requested digital content item to the category identifier;
   wherein the status code is further indicative of the requested content availability indicator.

7. The method of claim 1, wherein the characteristic includes at least one of: a Modulation and Coding Scheme (MCS) rate of data frame transmission along the network path, a throughput of the network path, or a latency of the network path.

8. The method of claim 1, further comprising:
   receiving a beacon frame transmitted by a second access point of the wireless mesh network, wherein the beacon frame includes a third value of the network resource utilization metric;
   comparing the first value and the third value;
   determining that the third value exceeds the first value; and
   transmitting, to the mesh network device, a disassociation notification identifying the second access point suggested for association by the mesh network device.

9. A method, comprising:
   determining, by a first access point of a wireless mesh network comprising an ingress device, a first network path to the ingress device;
   determining a first value of a network resource utilization metric characterizing data frame transmission along the first network path;
   receiving, by the first access point, a beacon frame transmitted by a second access point of the wireless mesh network, wherein the beacon frame includes a second value of the network resource utilization metric characterizing data frame transmission along a second network path between the ingress device and the second access point;
   receiving, by the first access point, a first association request transmitted by a mesh network device to the second access point, wherein the first association request comprises a content identifier of a requested digital content item;
   determining that the first value exceeds the second value;
   notifying the second access point of the first value; and
   fetching the requested digital content item from a content distribution node.

10. The method of claim 9, wherein the first association request includes a requested value of the network resource utilization metric, and wherein the method further comprises:
    determining that the requested value is less than or equal to the first value.

11. The method of claim 9, further comprising:
    receiving, from a network management service, a first content identifier of a first digital content item that is available via the first access point; and
    determining that the content identifier of the requested digital content item matches the first content identifier.

12. The method of claim 9, wherein the network resource utilization metric includes at least one of: a throughput value of the network path, a latency value of the network path or a Modulation and Coding Scheme (MCS) rate of data frame transmission along the network path.

13. The method of claim 9, further comprising:
    receiving, from the mesh network device, a second association request including a third value for the network resource utilization metric;
    determining that the third value is less than or equal to the first value; and
    transmitting, to the mesh network device, an association response including a status code indicative of acceptance of the second association request.

14. The method of claim 9, further comprising:
    receiving, from a network management service, a first content identifier of a first digital content item that is available via the first access point;
    determining that the content identifier of the requested digital content item matches the first content identifier; and transmitting, to the mesh network device, an association response including a status code indicative of acceptance of the association request.

15. A method, comprising:

determining, by an access point of a wireless mesh network comprising an ingress device, a network path from the access point to the ingress device;

determining a first value of a network resource utilization metric reflecting a characteristic of data frame transmission along the network path;

receiving, from a mesh network device of the wireless mesh network, an association request including a second value for the network resource utilization metric and a content identifier of a requested digital content item;

determining that the second value is less than or equal to the first value; and transmitting, to the mesh network device, an association response including a status code indicative of acceptance of the association request; and fetching the requested digital content item from a content distribution node.

16. The method of claim 15, wherein the characteristic includes at least one of: a Modulation and Coding Scheme (MCS) rate of data frame transmission along the network path, a throughput of the network path, or a latency of the network path.

17. The method of claim 15, further comprising:

receiving, from a network management service, a first content identifier of a first digital content item that is available via the access point; and producing a requested content availability indicator by comparing the content identifier of the requested digital content item to the first content identifier;

wherein the status code is further indicative of the requested content availability indicator.

* * * * *